March 19, 1963  HANS-MARTIN WEITZ ET AL  3,082,271
N-METHYL PYRROLIDONE FOR THE SEPARATION
OF OLEFINS FROM HYDROCARBON MIXTURES
Filed April 11, 1960
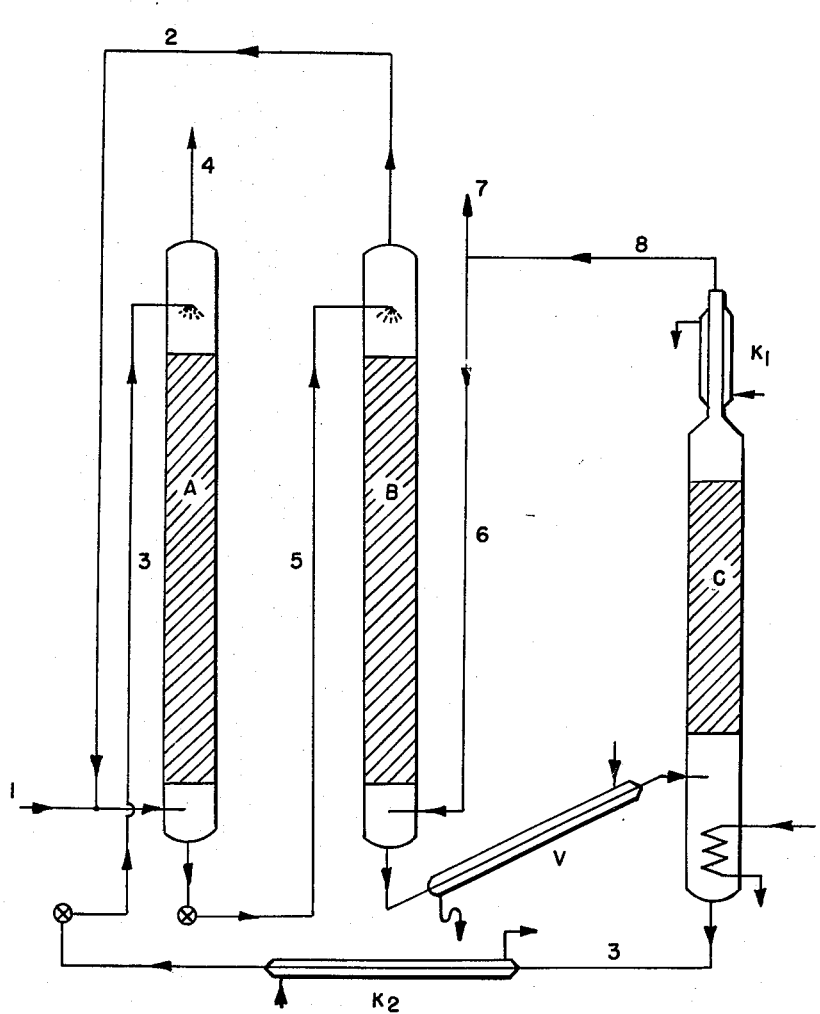
INVENTORS:
HANS-MARTIN WEITZ
LOTHAR LORENZ
BY
ATT'YS

3,082,271
N-METHYL PYRROLIDONE FOR THE SEPARATION OF OLEFINS FROM HYDROCARBON MIXTURES

Hans-Martin Weitz and Lothar Lorenz, both of Ludwigshafen (Rhine), Germany, assignors to Badische Anilin- & Soda - Fabrik Aktiengesellschaft, Ludwigshafen (Rhine), Germany
Filed Apr. 11, 1960, Ser. No. 21,529
Claims priority, application Germany Apr. 11, 1959
2 Claims. (Cl. 260—677)

This invention relates to a process for the separation of paraffins from hydrocarbon mixtures, especially for the separation of paraffins from hydrocarbon mixtures containing unsaturated hydrocarbons. More specifically, the invention relates to the use of special-type solvents in the separation of paraffins from olefins or mixtures of olefins and diolefins.

In the separation of paraffins and olefins, for example isobutane and butene-(1), it is common practice in the art to apply extractive distillation, as the method of fractional distillation fails by reason of the similarity of the boiling points.

According to another technique gas mixtures of the aforesaid kind are separated into their components parts by absorbing these in solvents having selective action and subsequently subjecting the solvents to fractional desorption.

We have now found that four- or five-membered hydrogenated heterocyclic compounds which contain nitrogen or oxygen as hetero atoms in addition to a carbonyl group are highly selective solvents for the paraffins and olefins in question and can therefore be used to special advantage for the purposes of our invention. In addition to four- and five-membered compounds, compounds of the said kind which contain 6 ring members may also be used.

Especially suitable as solvents among the said compounds are five-membered hydrogenated heterocyclic compounds which contain nitrogen or oxygen as hereto atoms and also contain a carbonyl group. Such compounds include N-methylpyrrolidone, pyrrolidone, formylpyrrolidine and butyrolactone.

The separation of paraffins and olefins by extractive distillation has already been attempted with furfurol or acetone as the selective solvent, but these known substances have considerable disadvantages; thus, for example, they are difficult to recover from the vapors or gases, their boiling points being relatively low as compared with those of the solvents to be used according to the present invention. The following table clearly shows this difference in comparative data for the known solvents and for two of the solvents according to this invention.

TABLE 1

| Solvent | Boiling point, °C. | Vapor pressure at 25° C. in mm. Hg |
|---|---|---|
| Acetone | 56.1 | 229.4 |
| Furfurol | 163 | 3.6 |
| N-methylpyrrolidone | 206 | 0.4 |
| Butyrolactone | 205.5 | 0.44 |

A further advantage of the solvents according to this invention is their superior selectivity as can be seen from Table 2. By selectivity we mean the quotient of the Bunsen's solubility quotent α of the two gases in the solvent used.

TABLE 2

| Solvent | Bunsen's solubility quotient (ml.gas/ml. solvent at 1 atm.) | | | | Selectivity | |
|---|---|---|---|---|---|---|
| | Isobutane | | Butene-1 | | | |
| | 25° C. | 50° C. | 25° C. | 50° C. | 25° C. | 50° C. |
| Pyrrolidone | 3.2 | 1.8 | 9.3 | 5.2 | 2.9 | 2.8 |
| N-methyl-pyrrolidone | 6.5 | 4.0 | 18.6 | 9.6 | 2.8 | 2.4 |
| N-formyl-pyrrolidine | 8.2 | 4.7 | 22.0 | 11.3 | 2.7 | 2.4 |
| Butyrolactone | 4.0 | 2.5 | 12.6 | 6.6 | 3.2 | 2.6 |

By comparison, the selectivity of acetone for isobutane/butene-1 at 25° C. is only 2.0.

The use of furfurol has the further disadvantage that working is made much more difficulty by reason of its well-known instability and its great sensitivity to air.

Further advantages in the use of the solvents according to this invention arise from the fact that by reason of the greater absolute solubility of the hydrocarbons in the solvents according to this invention it is possible to use smaller quantities of solvent and consequently smaller apparatus and especially columns of smaller separating efficiency.

Paraffin-olefin mixtures which lend themselves for separation by extractive distillation or selective absorption followed by fractional desorption by means of the solvents according to this invention include mixtures of propane and propene, butanes and butylenes, and mixtures of their methylated derivatives. Moreover, mixtures of paraffins and olefins with 6 to 12 carbon atoms can also be separated, as well as mixtures of which the components are not of uniform C-number. Mixtures which, in addition to paraffins and olefins, also contain diolefins, can also be separated. For example those mixtures can be used with advantage which have been obtained in cracking or dehydrogenation processes. Such mixtures normally have a content of 10 to 80% of paraffins, 10 to 70% of olefins and about 5 to 45% of diolefins, the proportions of the individual components varying depending on the reaction conditions of the particular cracking or dehydrogenation process. These mixtures lend themselves especially well for the separation by means of the solvents according to this invention. The diolefins are separated together with the mono-olefins and the resultant mixture of the unsaturated aliphatic hydrocarbons can be further split up by conventional methods.

The hydrocarbon mixtures to be separated may also contain acetylenic compounds, as for example vinylacetylene or propine.

It has been proposed to use heterocyclic compounds containing nitrogen or oxygen atoms and having a carbonyl group for the separation of diolefins and olefins. This process takes advantage of the greater solubility of the diolefins in the solvent. By comparison, the porcess according to the present invention is based on the surprising discovery that the selective dissolving power of the solvents for olefins is sufficient to make possible a separation of the olefins from paraffins, the amount of the solvent being so correlated to the solubility of the olefin that the amount of olefin contained in the gas stream to be treated with the solvent is dissolved.

The selectivity of the solvent can be further enhanced by adding water. The amount of water must not exceed a certain limit as the solubility of the gases decreases as the content of water increases; it should be about 1 to 15% by weight, advantageously 3 to 7%, with reference to the amount of solvent.

The following examples, given with reference to the accompanying drawing, will further illustrate this invention but the invention is not restricted to these examples or to the arrangement shown in the drawing.

*Example 1*

30 liters per hour (N.T.P.) of a gas mixture which contains about equal parts of butene-(1) and isobutane and traces of ethylene and propane are introduced through a line 1 into the bottom of a column A which is 20 mm. in diameter and 1800 mm. in length and is packed with rings of stainless steel netting, and at the same time 30 liters per hour (N.T.P.) of recycle gas are introduced through a line 2.

At the same time 4.2 liters per hour of N-methylpyrrolidone which contains about 5% by weight of water are led in through a line 3 and sprayed into the column A from the top. At a working temperature of 20° C., the gas mixture is washed out in countercurrent to such an extent that the gas leaving through line 4 (15 liters per hour) contains only 2 to 3% of butene-(1). The N-methylpyrrolidone containing butene leaves column A through the bottom and is passed through line 5 to the top of column B, which has the same dimensions as the column A and is equally packed with rings of stainless steel netting. In the column B, the N-methylpyrrolidone comes into contact with the part of the butene returned from a column C through line 6. The N-methylpyrrolidone which is then saturated with butene-(1) is then led from the bottom of the column B through a preheater V into the column C and degassed therein by indirect heating with steam. During the degassing, the temperature is so controlled that the water content of the N-methylpyrrolidone is 5%; i.e., the temperature is 150° C. in the present case. The gas set free, after condensation of the entrained stream in a cooler $K_1$, is withdrawn through line 8 and, after 13 liters per hour have been withdrawn through line 7 as pure butene-(1), returned through line 6 to the column B. The pure butene-(1) branched off contains only 1 to 1.5% of extraneous gas. The degassed N-methylpyrrolidone is returned to column A from the top through line 3 after having passed through an interposed water cooler $K_2$ and having been cooled therein to 20° C.

*Example 2*

In the same manner as described in Example 1 a mixture consisting of about 10% by volume of propane and 90% by volume of propylene is separated into its pure components. For this purpose 5 liters (N.T.P.) of the gas mixture and 7.5 liters per hour (N.T.P.) of recycle gas from column B are fed into column A through lines 1 and 2, respectively. At the same time 4 liters per hour of N-methylpyrrolidone are fed into column A through line 3. The two gases obtained have a purity of more than 99%.

*Example 3*

A gaseous hydrocarbon mixture of 57% by volume of $C_4$ paraffins, 31% by volume of $C_4$ olefins, 11% by volume of butadiene and about 1% by volume of $C_3$ hydrocarbons, such as occurs in dehydrogenation processes, is fed, at a rate of 35 liters (N.T.P.) per hour, into the middle part of a distillation column 20 mm. in diameter and 3,500 mm. in length, which is packed with rings of wire netting. At the same time 4 liters per hour of butyrolactone is fed into the column a short distance from the top. Withdrawn from the column overhead are about 20 liters per hour of a mixture of n-butane and isobutane together with $C_3$ hydrocarbons and about 0.5% by volume of butene-(1). The solvent which flows into the sump of the column is heated to 160°–165° C. therein so that it is completely stripped of $C_4$ paraffins and partly stripped of $C_4$ olefins. The gases thus disengaged pass upwardly in the column and thus are again in contact with the solvent, the $C_4$ olefins thus being separated again from the $C_3$ paraffins except for the small portion which, as said above, leaves overhead together with the top fraction. From the sump of the column the solvent flows into the middle part of a second column of the same size as the first column, the sump of which is heated to the boiling point of the solvent (206° C.). The olefins and diolefins are withdrawn at the top of the second column. They have a purity of more than 99%. The solvent coming from the sump of the second column is cooled and recycled into the upper part of the first column.

*Example 4*

A mixture of 67% by weight of iso-pentane, 4% by weight of 3-methylbutene-(1), 7% by weight of 2-methylbutene-(2), 5% by weight of 2-methylbutene-(1), 15% by weight of isoprene and 2% by weight of butadiene, such as occurs in the dehydrogenation of iso-pentane, is separated in a manner analogous to that described in Example 3. The solvent used is N-methylpyrrolidone which is fed into the first column at a short distance from the top at a temperature of 25° to 30° C. and at a rate of 2 liters per hour. At the same time, 300 ml. of the liquid hydrocarbon mixture, heated to just below the boiling point, is fed into the column at its middle part. The iso-pentane withdrawn at the head of the first column which contains about 0.5% by weight of 3-methylbutene-(1), is partially recycled in liquid form to the column and fed into this at its top. At the top of the second column there is obtained a mixture of the methylbutenes which are practically free of paraffins, together with butadiene and isoprene.

*Example 5*

A $C_4$ fraction of the following composition: 0.5% by volume of butadiene, 8.8% by volume of cis-butene-(2), 14.6% by volume of trans-butene-(2), 0.9% by volume of iso-butene, 59.2% by volume of butene-(1), 12.7% by volume of n-butane, 2.9% by volume of iso-butane and 0.4% by volume of 2-methylbutene-(1), which is obtained in a cracking process and has been substantially stripped of butadiene and iso-butene is fed, at a rate of 10 m.³ per hour, into the middle part of a packed column 150 mm. in diameter and 20 m. in length. At the same time, 500 liters of N-methylpyrrolidone which contains 5% by weight of water is fed into the column from the top. The gas withdrawn at the top of the column consists of about 90% of butanes and about 10% of butenes, mainly butene-(1). The sump of this column is heated to 105°–110° C. and the effluent solvent in which particularly the olefines are still contained in liquid condition, is fed into a second column 150 mm. in diameter and 15 m. in length, at the upper third thereof. At the top of this column a butene mixture is obtained which contains less than 1% by volume of paraffins. The hydrocarbons, dissolving more readily in the solvent than the butenes, such as butadiene and 2-methylbutene-(1), which in part are more highly unsaturated or have a higher boiling point than the butenes and which would become more and more enriched in the solvent, are withdrawn over a supplementary column attached to the second column between the inlet of the absorption solution and the sump. The sump in this second column is heated to and kept at a temperature of 140° and 145° C., which is the boiling point of aqueous N-methylpyrrolidone. The effluent solvent, after having cooled down, is recycled to the first column and fed into it at the top.

We claim:

1. A process for separating olefins from paraffins by the use of a selective solvent which comprises: contacting a mixture consisting essentially of olefins containing from 3 to 12 carbon atoms and paraffins containing from 3 to 12 carbon atoms with N-methylpyrrolidone in the presence of from 0 to 15% water by weight based on the weight of N-methylpyrrolidone, whereby said olefins are selectively dissolved in said N-methylpyrrolidone, separating the N-methylpyrrolidone solution from said paraffins, and thereafter heating said N-methylpyrrolidone solution to remove the gaseous olefins from said solution.

2. A process as in claim 1 wherein said process is carried out in the presence of from about 3 to about 7% of water based on the weight of the N-methylpyrrolidone.

References Cited in the file of this patent

UNITED STATES PATENTS

| | | |
|---|---|---|
| 2,831,905 | Nelson | Apr. 22, 1958 |
| 2,840,511 | Rylander et al. | June 24, 1958 |
| 2,933,448 | Morin et al. | Apr. 19, 1960 |